(12) United States Patent
Bailey et al.

(10) Patent No.: US 7,575,849 B2
(45) Date of Patent: Aug. 18, 2009

(54) IMAGING LAYERS AND STRUCTURES INCLUDING IMAGING LAYERS

(75) Inventors: Susan E. Bailey, Corvallis, OR (US); Vladek Kasperchik, Corvallis, OR (US); Paul J. McClellan, Bend, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 10 days.

(21) Appl. No.: 11/860,660

(22) Filed: Sep. 25, 2007

(65) Prior Publication Data

US 2009/0081584 A1    Mar. 26, 2009

(51) Int. Cl.
*G03F 7/00* (2006.01)
*G03F 7/004* (2006.01)

(52) U.S. Cl. .............. 430/270.1; 430/270.15; 430/19; 430/321; 430/333; 430/330

(58) Field of Classification Search .......... 430/270.1, 430/270.15, 321, 333, 330, 19
See application file for complete search history.

(56) References Cited

U.S. PATENT DOCUMENTS

| | | | |
|---|---|---|---|
| 7,270,865 B2 * | 9/2007 | Gore | 428/64.4 |
| 2005/0053748 A1 * | 3/2005 | Gore et al. | 428/64.4 |
| 2007/0212639 A1 * | 9/2007 | Kasperchik et al. | 430/270.1 |
| 2007/0238045 A1 * | 10/2007 | Brocklin et al. | 430/270.1 |
| 2007/0238613 A1 * | 10/2007 | Brocklin et al. | 503/226 |
| 2007/0281244 A9 * | 12/2007 | Kasperchik et al. | 430/270.1 |

OTHER PUBLICATIONS

Masao Tanaka, "Phthalocyanines—High Performance Pigments with New Applications", High Performance Pigments (2002).*

* cited by examiner

*Primary Examiner*—Amanda C. Walke

(57) ABSTRACT

Imaging layers, imaging media, and methods of preparation of each, are disclosed.

23 Claims, 1 Drawing Sheet

IMAGING LAYERS AND STRUCTURES INCLUDING IMAGING LAYERS

BACKGROUND

Compositions that produce a color change upon exposure to energy in the form of light are of great interest in producing images on a variety of substrates. For example, labeling of optical storage media such as Compact Discs, Digital Video Discs or Blue Laser Discs (CD, DVD, or Blue Laser Disc) can be routinely accomplished through screen-printing methods. While this method can provide a wide variety of label content, it tends to be cost ineffective for run lengths less than 300-400 discs because the fixed cost of unique materials and set-up are shared by all the discs in each run. In screen-printing, a stencil of the image is prepared, placed in contact with the disc and then ink is spread by squeegee across the stencil surface. Where there are openings in the stencil the ink passes through to the surface of the disc, thus producing the image. Preparation of the stencil can be an elaborate, time-consuming and expensive process.

In recent years, significant increases in use of CD/DVD discs as a data distribution vehicle have increased the need to provide customized label content to reflect the data content of the disc. For these applications, the screen-label printing presents a dilemma as discs are designed to permit customized user information to be recorded in standardized CD, DVD, or Blue Laser Disc formats. Today, for labeling small quantities of discs, popular methods include hand labeling with a permanent marker pen, using an inkjet printer to print an adhesive paper label, and printing directly with a pen on the disc media which has a coating that has the ability to absorb inks. The hand printing methods do not provide high quality and aligning a separately printed label by hand is inexact and difficult.

It may therefore be desirable to design an optical data recording medium (e.g., CD, DVD, or Blue Laser Disc) which can be individually labeled by the user easily and inexpensively relative to screen-printing while giving a high quality label solution.

SUMMARY

Briefly described, embodiments of this disclosure include materials, imaging layers, imaging media, and methods of making each. One exemplary embodiment of an imaging layer, among others, includes: a substrate having an imaging layer disposed thereon, wherein the layer includes: a matrix; a radiation-absorbing compound having at least two energy absorption peaks corresponding to about 780 nm and about 650 nm, respectively; an activator; and a color former.

One exemplary embodiment of an optical disk, among others, includes: imaging layer that includes: a matrix; a radiation-absorbing compound having at least two energy absorption peaks corresponding to about 780 nm and about 650 nm, respectively; an activator; and a color former.

One exemplary embodiment of a material, among others, includes: a matrix; a radiation-absorbing compound having at least two energy absorption peaks corresponding to about 780 nm and about 650 nm, respectively; an activator; and a color former.

One exemplary embodiment of a method for preparing a recording medium, among others, includes: providing a matrix, a radiation-absorbing compound having at least two energy absorption peaks corresponding to about 780 nm and about 650 nm, respectively, an activator, and a color former; mixing the radiation-absorbing compound, the activator, and the color former, in the matrix to form a matrix mixture; and disposing the matrix mixture onto a substrate to form the imaging layer.

One exemplary embodiment of an imaging layer, among others, includes: a substrate having an imaging layer disposed thereon, wherein the layer includes: a matrix; a first radiation-absorbing compound that absorbs light energy at about 780 nm and a second radiation-absorbing compound that absorbs light energy at about 650 nm; an activator; and a color former.

One exemplary embodiment of an optical disk, among others, includes: imaging layer that includes: a matrix; a first radiation-absorbing compound that absorbs light energy at about 780 nm and a second radiation-absorbing compound that absorbs light energy at about 650 nm; an activator; and a color former.

One exemplary embodiment of a material, among others, includes: a matrix; a first radiation-absorbing compound that absorbs light energy at about 780 nm and a second radiation-absorbing compound that absorbs light energy at about 650 nm; an activator; and a color former.

One exemplary embodiment of a method for preparing a recording medium, among others, includes: providing a matrix, a first radiation-absorbing compound that absorbs light energy at about 780 nm, a second radiation-absorbing compound that absorbs light energy at about 650 nm, an activator, and a color former; mixing the first radiation-absorbing compound, the second radiation-absorbing compound, the activator, and the color former, in the matrix to form a matrix mixture; and disposing the matrix mixture onto a substrate to form the imaging layer.

One exemplary embodiment of an imaging layer, among others, includes: a substrate having an imaging layer disposed thereon, wherein the layer includes: a matrix; a first radiation-absorbing compound that absorbs light energy at about 780 nm and a third radiation-absorbing compound that bleaches upon exposure to about 280 to 480 nm; an activator; and a color former.

One exemplary embodiment of an optical disk, among others, includes: imaging layer that includes: a matrix; a first radiation-absorbing compound that absorbs light energy at about 780 nm and a third radiation-absorbing compound that bleaches upon exposure to about 280 to 480 nm; an activator; and a color former.

One exemplary embodiment of a material, among others, includes: a matrix; a first radiation-absorbing compound that absorbs light energy at about 780 nm and a third radiation-absorbing compound that bleaches upon exposure to about 280 to 480 nm; an activator; and a color former.

One exemplary embodiment of a method for preparing a recording medium, among others, includes: imaging layer that includes: providing a matrix, a first radiation-absorbing compound that absorbs light energy at about 780 nm, a third radiation-absorbing compound that bleaches upon exposure to about 280 to 480 nm, an activator, and a color former; mixing the first radiation-absorbing compound, the third radiation-absorbing compound, the activator, and the color former, in the matrix to form a matrix mixture; and disposing the matrix mixture onto a substrate to form the imaging layer.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Figure 2:
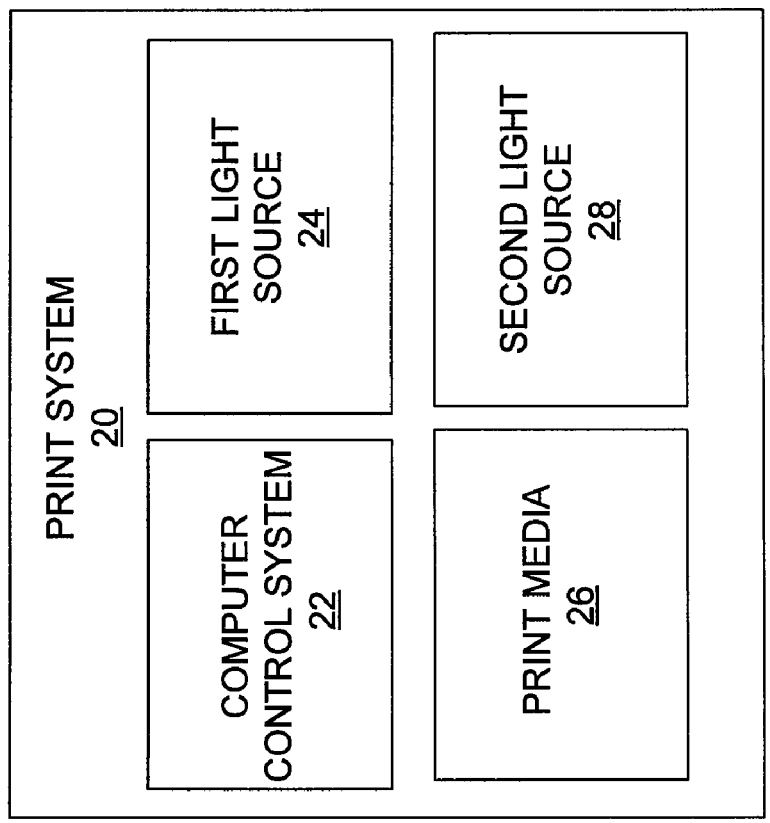
FIG. 2 illustrates a representative embodiment of a print system.

Embodiments of the present disclosure will employ, unless otherwise indicated, techniques of synthetic organic chemistry, ink chemistry, media chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the term "leuco-dye" means a color-forming substance that is colorless or of a first color in a non-activated state, and subsequently exhibits color or changes from the first color to a second color in an activated state.

As used herein, the term "activator" is a substance that reacts with a color former such as a leuco-dye, causing the leuco-dye to alter its chemical structure and change or acquire color.

As used herein, the term "antenna" is a radiation-absorbing compound. The antenna readily absorbs at one or more desired wavelengths (e.g., about 780 nm and/or about 650 nm) of the marking radiation.

The term "bleach" or "bleaches" can include decomposition or degradation of a radiation-absorbing compound such that the radiation-absorbing compound ceases to function as a radiation-absorbing compound. For the radiation-absorbing compounds with extinction peaks within visible range (e.g., about 400-700 nm), bleaching leads to loss or change in visible coloration.

Discussion

Embodiments of the disclosure include materials, imaging layers, imaging media, and methods of making each. The imaging layer can be marked using either a 780 nm light source and/or a 650 nm light source. In an embodiment, the imaging medium includes an imaging layer or coating including, but not limited to, a matrix, a color former, an activator, and a radiation-absorbing compound having at least two energy absorption peaks corresponding to about 780 nm and about 650 nm, respectively. In another embodiment, the imaging medium includes an imaging layer or coating including, but not limited to, a matrix, a color former, an activator, a first radiation-absorbing compound capable of absorbing radiation energy at about 780 nm, and a second radiation-absorbing compound capable of absorbing radiation energy at about 650 nm. In another embodiment, the imaging medium includes an imaging layer or coating including, but not limited to, a matrix, a color former, an activator, a first radiation-absorbing compound capable of absorbing radiation energy at about 780 nm, and a third radiation-absorbing compound capable of being bleached at a wavelength of about 280 nm to 480 nm. Thus, each of the embodiments of the present disclosure can be imaged using an imaging system including a 780 nm light source or a 650 nm light source.

It should be noted that a general reference to a radiation-absorbing compound includes reference to the a radiation-absorbing compound having at least two energy absorption peaks corresponding to about 780 nm and about 650 nm, respectively, the first radiation-absorbing compound, the second radiation-absorbing compound, the third radiation-absorbing compound, combinations of the first radiation-absorbing compound and the second radiation-absorbing compound, and combinations of the first radiation-absorbing compound and the third radiation-absorbing compound, unless it is clear from the context that only one of the radiation-absorbing compound having at least two energy absorption peaks corresponding to about 780 nm and about 650 nm, respectively, the first radiation-absorbing compound, the second radiation-absorbing compound, and the third radiation-absorbing compound are being referenced.

The imaging layer can be a coating disposed onto a substrate and used in imaging media such as, but not limited to, paper, digital recording material, cardboard (e.g., packaging box surface), plastic (e.g., food packaging surface), and the like. A clear mark and excellent image quality can be obtained by directing radiation energy at areas of the imaging layer on which a mark is desired. The radiation energy can be one or both of radiation energy of about 780 nm or 650 nm since the imaging layer can absorb at both wavelengths. As mentioned above, the imaging layer includes radiation-absorbing compound(s) that are used to produce the mark via a color change (e.g., blue to black and/or blue to transparent (bleaching)) upon stimulation by energy. In an embodiment, when the radiation-absorbing compound absorbs a defined radiation energy (e.g., about 780 nm and/or about 650 nm) and converts it to heat, the heat generated from the radiation-absorbing compound(s) allows a reaction between the color former and the activator to occur and to produce a color change (e.g., a mark (blue to black)).

In an embodiment, the components of the imaging layer can be dissolved into a matrix material. In another embodiment, one or more components can be insoluble or substantially insoluble in the matrix material at ambient temperatures, where the components are uniformly dispersed throughout the matrix material.

In an embodiment that includes the first and the third radiation-absorbing compound and after the label is formed on the imaging layer, the imaging media or the imaging media including the imaging layer could be exposed to a bleaching light source that emits radiation that bleaches the third radiation-absorbing compound (blue to transparent or colorless). The intentional bleaching (e.g., causing the third radiation-absorbing compound to become decomposed or degraded) of the third radiation-absorbing compound may be advantageous because the color signature of the third radiation-absorbing compounds is removed to provide a better color background and/or better color contrast to the marked areas of the imaging layer. It should be noted that when the color signature of the third radiation-absorbing compound is removed the color of the material below the imaging layer is the color present after the third radiation-absorbing compound is bleached.

The bleaching light source can include, but is not limited to, a light source emitting radiation from about 280 to 480 nm, about 360 to 480 nm, and about 395 to 480 nm. The source of the radiation can include, but is not limited to, a Mercury arc lamp, a fluorescence bulb, an UV LEDs, a laser, combinations thereof, and the like. In an embodiment, a laser light source can be used to confine the bleaching to a defined area. In an embodiment, a mask can be used if the bleaching light is unfocused (e.g., use of a Mercury arc lamp or a fluorescence bulb). The exposure time (e.g., a few seconds to a minute or more) of the imaging layer to the bleaching radiation depends, at least in part, upon the light source and the concentration of the second radiation-absorbing compound in the imaging layer.

Figure 1:
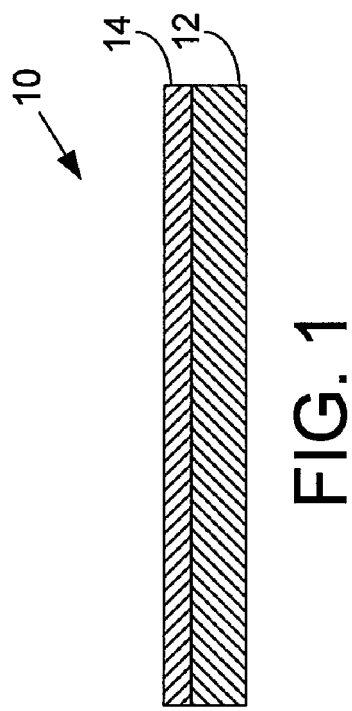
FIG. 1 illustrates an embodiment of an imaging medium.

FIG. 1 illustrates an embodiment of an imaging medium 10. The imaging medium 10 can include, but is not limited to, a substrate 12 and a imaging layer 14 (e.g., that includes radiation-absorbing compound(s)). The substrate 12 can be a substrate upon which it is desirable to make a mark, such as, but not limited to, paper (e.g., labels, tickets, receipts, or stationery), overhead transparencies, a metal/metal composite, glass, a ceramic, a polymer, and a labeling medium (e.g., a compact disk (CD) (e.g., CD-R/RW/ROM) and a digital video disk (DVD) (e.g., DVD-R/RW/ROM)).

In particular, the substrate 12 includes an "optical disk" which is meant to encompass audio, video, multi-media, and/or software disks that are machine readable in a CD and/or DVD drive, or the like. Examples of optical disk formats include writeable, writeable and rewriteable disks such as DVD, DVD-ROM, DVD-R, DVD-RW, DVD+R, DVD+RW, DVD-RAM, DVD-DL, DVD+DL, CD, CD-ROM, CD-R, CD-RW, HD DVD, Blu-ray, and the like. Other like formats can also be included, such as similar formats and formats to be developed in the future.

In an embodiment, the imaging layer 14 can include, but is not limited to, the matrix, the color former, the activator, a radiation-absorbing compound having at least two energy absorption peaks corresponding to about 780 nm and about 650 nm, respectively, as well as other components typically found in the particular media to be produced.

In another embodiment, the imaging layer 14 can include, but is not limited to, the matrix, the color former, the activator, the first radiation-absorbing compound, the second radiation-absorbing compound, as well as other components typically found in the particular media to be produced. The first radiation-absorbing compound capable of absorbing radiation energy at about 780 nm to produce a mark, and the second radiation-absorbing compound capable of absorbing radiation energy at about 650 nm to produce a mark.

In another embodiment, the first radiation-absorbing compound can be used to form a mark using a 780 nm energy source, while a negative mark (bleaching) can be produced by exposing the third radiation-absorbing compound to a bleaching energy source (e.g., a wavelength of about 280 nm to 480 nm).

The imaging layer 14 may be applied to the substrate 12 via any acceptable method, such as, but not limited to, rolling, spraying, and screen-printing. In addition, one or more layers can be formed between the imaging layer 14 and the substrate 12 and/or one or more layer can be formed on top of the imaging layer 14. In one embodiment, the imaging layer 14 is part of a CD or a DVD.

To form a mark, radiation energy is directed imagewise at one or more discrete areas of the imaging layer 14 of the imaging medium 10. The form of radiation energy may vary depending upon the equipment available, ambient conditions, the desired result, and the like. The radiation energy can include, but is not limited to, infrared (IR) radiation, ultraviolet (UV) radiation, x-rays, and visible light. In an embodiment the radiation can be about 780 nm and/or about 650 nm. The radiation-absorbing compound(s) absorbs the radiation energy and heats the area of the imaging layer 14 to which the radiation energy impacts. The heat may cause the color former and the activator to mix. The color former and the activator may then react to form a mark (color) on certain areas of the layer 14.

In an embodiment that includes the first and the third radiation-absorbing compound and after the label is formed on the imaging layer 14 (e.g., formation of a positive mark using the about 780 nm and the first radiation-absorbing compound), the imaging medium 10 or the portion of the imaging medium 10 including the imaging layer 14 could be exposed to a light source that emits radiation that bleaches the third radiation-absorbing compound (blue to transparent or colorless) to produce a negative mark.

FIG. 2 illustrates a representative embodiment of a print system 20. The print system 20 can include, but is not limited to, a computer control system 22, a first light source 24 (a source emitting at about 780 nm or about 650 nm), and a print media 26 (e.g., imaging medium). In addition, the print system 20 includes a second light source 28 (a source emitting at about 780 nm or about 650 nm, but different than the first light source 24). The computer control system 22 is operative to control the first and/or the second light sources 24 and 28 to cause marks (e.g., printing of characters, symbols, photos, and the like) to be formed on the print media 26. The first light source and the second light source 24 can include, but are not limited to, a laser system, UV energy system, IR energy system, visible energy system, x-ray system, and other systems that can produce radiation energy to cause a mark to be formed on the layer 14. In particular, the first and the second light sources emit at one of about 780 nm and about 650 nm. The print system 20 can include, but is not limited to, a laser printer system and an ink-jet printer system. In addition, the print system 20 can be incorporated into a digital media system. For example, the print system 20 can be operated in a digital media system to print labels (e.g., the layer is incorporated into a label) onto digital media such as CDs and DVDs. Furthermore, the print system 20 can be operated in a digital media system to directly print onto the digital media (e.g., the layer is incorporated the structure of the digital media).

In another embodiment, the print system 20 includes a bleaching light source (not shown). The bleaching light source can include, but is not limited to, a light source emitting radiation from about 280 to 480 nm, about 360 to 480 nm, and about 395 to 480 nm. The source of the radiation can include, but is not limited to, a Mercury arc lamp, a fluorescence bulb, an UV LEDs, a laser, combinations thereof, and the like. The exposure time (e.g., a few seconds to a minute or more) of the imaging layer to the bleaching radiation depends, at least in part, upon the light source as well as the photostability and the concentration of the third radiation-absorbing compound in the imaging layer.

As mentioned above, an embodiment of the imaging layer includes, but is not limited to, the matrix, the color former, the activator, and the radiation-absorbing compound having at least two energy absorption peaks corresponding to about 780 nm and about 650 nm, respectively. Thus, substrates including the imaging layer having the radiation-absorbing compound can be used in imaging systems that include a 780 nm light source and/or a 650 nm light source. The radiation-absorbing compound includes, but is not limited to Dye LS231 by Sanyo Color Works, LTD.

The a radiation-absorbing compound having at least two energy absorption peaks corresponding to about 780 nm and about 650 nm, respectively, can be about 0.05 wt % to 5 wt % of the imaging layer, about 0.1 wt % to 3 wt % of the imaging layer, and about 0.5 wt % to 2 wt % of the imaging layer.

As mentioned above, an embodiment of the imaging layer includes, but is not limited to, the matrix, the color former, the activator, the first radiation-absorbing compound, and the second radiation-absorbing compound. The first radiation-absorbing compound can absorb radiation energy at about 780 nm, while the second radiation-absorbing compound can absorb radiation energy at about 650 nm. Thus, substrates including the imaging layer having the first radiation-absorbing compound and the second radiation-absorbing compound can be used in imaging systems that include a 780 nm light source and/or a 650 nm light source.

The first radiation absorbing compound can include, but is not limited to:

a), IR780 (Aldrich 42,531-1) (structure 1) (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI));

b) IR783 (Aldrich 54,329-2) (structure 2) (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt);

c) Syntec 9/1 (structure 3));

d) Syntec 9/3 (structure 4);

or metal complexes (e.g., dithiolane metal complexes (structure 5) and indoaniline metal complexes (structure 6)).

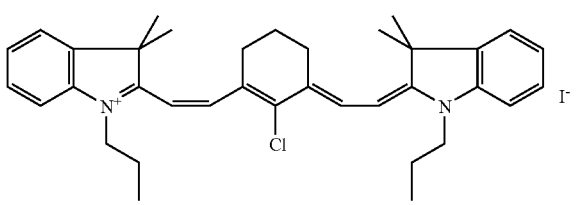
(1)

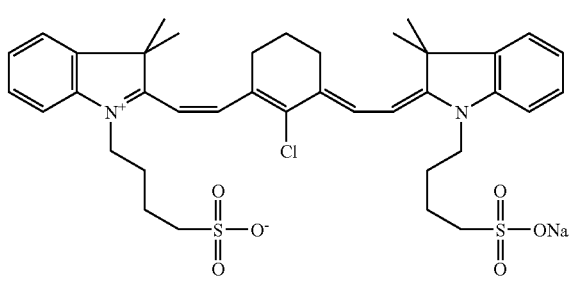
(2)

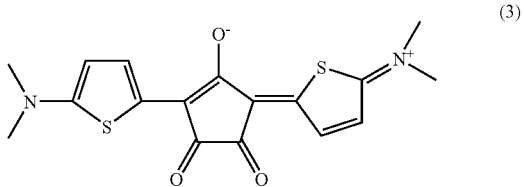
(3)

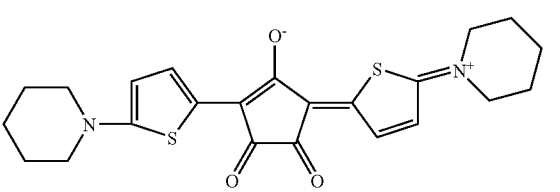
(4)

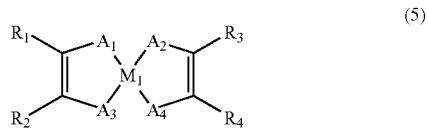
(5)

where $M_1$ is a transition metal, $R_1$, $R_2$, $R_3$, and $R_4$ are alkyl or aryl groups with or without halo substituents, and $A_1$, $A_2$, $A_3$, and $A_4$ can be S, NH, or Se;

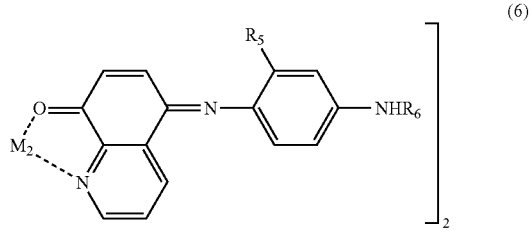
(6)

where $M_2$ is Ni or Cu and $R_5$ and $R_6$ are aryl or alkyl groups with or without halo substituents.

Additional examples of first radiation absorbing compounds can be found in "Infrared Absorbing Dyes", Matsuoka, Masaru, ed., Plenum Press (1990) (ISBN 0-306-43478-4) and "Near-infrared Dyes for High Technology Applications", Daehne, S.; Resch-Genger, U.; Wolfbeis, O., Ed., Kluwer Academic Publishers (ISBN 0-7923-5101-0), both incorporated herein by reference.

The first radiation-absorbing compound can be about 0.05 wt % to 5 wt % of the imaging layer, about 0.1 wt % to 3 wt % of the imaging layer, and about 0.5 wt % to 2 wt % of the imaging layer.

The second radiation absorbing compound can include, but is not limited to, indocyanine dyes such as:

a) 3H-indolium,2-[5-(1,3-dihydro-3,3-dimethyl-1-propyl-2H-indol-2-ylidene)-1,3-pentadienyl]-3,3-dimethyl-1-propyl-,iodide) (Dye 724 Amax 642 nm), b) 3H-indolium,1-butyl-2-[5-(1-butyl-1,3-dihydro-3,3-dimethyl-2H-indol-2-ylidene)-1,3-pentadienyl]-3,3-dimethyl-perchlorate (Dye 683 $A_{max}$ 642 nm), c) and phenoxazine derivatives such as phenoxazin-5-ium, 3,7-bis(diethylamino)-perchlorate(oxazine 1 $A_{max}$=645 nm).

The second radiation-absorbing compound can be about 0.05 wt % to 5 wt % of the imaging layer, about 0.1 wt % to 3 wt % of the imaging layer, and about 0.5 wt % to 2 wt % of the imaging layer.

As mentioned above, an embodiment of the imaging layer includes, but is not limited to, the matrix, the color former, the activator, the first radiation-absorbing compound, and the third radiation-absorbing compound. The first radiation-absorbing compound can absorb radiation energy at 780 nm, while the third radiation-absorbing compound can be bleached at a wavelength (e.g., about 280 nm to 480 nm). Thus, substrates including the imaging layer having the first radiation-absorbing compound and the second radiation-absorbing compound can be used in imaging systems that include a 780 nm light source and/or a 650 nm light source.

The third radiation absorbing compound can include compounds that photodegrade including 650 nm absorbing compounds. The 650 nm absorbing compounds can include, but are not limited, 3-Ethyl-2-[5-(3-ethyl-2-benzothiazolinylidene)-1,3-pentadienyl]benzothiazolium iodide, 1,1'-Dibutyl-3,3,3',3'-tetramethylindodicarbocyanine perchlorate, and 1,1'-Dibutyl-3,3,3',3'-tetramethylindadicarbocyanine hexafluorophosphate. These compounds would enable imaging the coating for multiple colors.

The third radiation-absorbing compound can be about 0.05 wt % to 5 wt % of the imaging layer, about 0.1 wt % to 3 wt % of the imaging layer, and about 0.5 wt % to 2 wt % of the imaging layer.

The matrix, the color former, the activator, and other components described below can be used in any of the embodiments described herein.

The matrix can include compounds capable of and suitable for dissolving and/or dispersing the radiation absorbing compound, the activator, and/or the color former. The matrix can include, but is not limited to, UV curable monomers, oligomers, and pre-polymers (e.g., acrylate derivatives. Illustrative examples of UV-curable monomers, oligomers, and pre-polymers (that may be mixed to form a suitable UV-curable matrix) can include but are not limited to, hexamethylene diacrylate, tripropylene glycol diacrylate, lauryl acrylate, isodecyl acrylate, neopentyl glycol diacrylate, 2-phenoxyethyl acrylate, 2(2-ethoxy)ethylacrylate, polyethylene glycol diacrylate and other acrylated polyols, trimethylolpropane triacrylate, pentaerythritol tetraacrylate, ethoxylated bisphenol A diacrylate, acrylic oligomers with epoxy functionality, and the like.

In an embodiment the matrix is used in combination with a photo package. A photo package may include, but is not limited to, a light absorbing species, which initiates reactions for curing of a matrix such as, by way of example, benzophenone derivatives. Other examples of photoinitiators for free radical polymerization monomers and pre-polymers include, but are not limited to, thioxanethone derivatives, anthraquinone derivatives, acetophenones and benzoine ether types, and the like.

It may be desirable to choose a matrix that is cured by a form of radiation other than the type of radiation that causes a color change. Matrices based on cationic polymerization resins may include photo-initiators based on aromatic diazonium salts, aromatic halonium salts, aromatic sulfonium salts and metallocene compounds, for example. An example of a matrix may include CDG000—a UV-curable lacquer made by "Nor-Cote". Other acceptable matrices may include, but is not limited to, acrylated polyester oligomers (e.g., CN293 and CN294, available from Sartomer Co.).

The matrix compound is about 2 wt % to 98 wt % of the imaging layer and about 20 wt % to 90 wt % of the imaging layer.

As mentioned above, color formers can be included in the imaging layer. The color formers can include, but are not limited to, leuco dyes and phthalide color formers (e.g., fluoran leuco dyes and phthalide color formers as described in "The Chemistry and Applications of Leuco Dyes", Muthyala, Ramiah, ed., Plenum Press (1997) (ISBN 0-306-45459-9), which is incorporated herein by reference).

The color formers can include, but is not limited to, a wide variety of leuco dyes. Suitable leuco dyes include, but are not limited to, fluorans, phthalides, amino-triarylmethanes, aminoxanthenes, aminothioxanthenes, amino-9,10-dihydroacridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinon-es, tetrahalo-p,p'-biphenols, 2(p-hydroxyphenyl)-4,5-diphenylimidazoles, phenethylanilines, phthalocyanine precursors (such as those available from Sitaram Chemicals, India), and other known leuco dye compositions. Experimental testing has shown that fluoran based dyes are one class of leuco dyes which exhibit particularly desirable properties.

In one aspect of the present disclosure, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-meth-yl-7-anilinofluorane, 3-(N-ethyl-N-isoamylamino)-6-methyl-7-anilinofluoran-e, 3-diethylamino-6-methyl-7-(o,p-dimethylanilino)fluorane, 3-pyrrolidino-6-methyl-7-anilinofluorane, 3-piperidino-6-methyl-7-anilino-fluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-tetrachloro-3,3-bis[2-[4-(dimethylamino)phenyl]-2-(4-methoxyphenyl)ethenyl]-, 2-anilino-3-methyl-6-(N-ethyl-N-isoamylamino)fluorane (S-205 available from Nagase Co., Ltd), and mixtures thereof.

Suitable aminotriarylmethane leuco dyes can also be used in embodiments of the preset disclosure, such as tris(N,N-dimethylaminophenyl)methane (LCV), tris(N,N-diethylaminophenyl) methane (LECV), tris(N,N-di-n-propylaminophenyl)methane (LPCV), tris(N,N-di-n-butylaminophenyl) methane (LBCV), bis(4-diethylaminophenyl)-(4-diethylamino-2-methyl-phenyl)methane (LV-1), bis(4-diethylamino-2-meth-ylphenyl)-(4-diethylamino-phenyl) methane (LV-2), tris(4-diethylamino-2-met-hylphenyl) methane (LV-3), bis(4-diethylamino-2-methylphenyl)(3,4-dimethoxy-phenyl)methane (LB-8), aminotriarylmethane leuco dyes having different alkyl substituents bonded to the amino moieties wherein each alkyl group is independently selected from C1-C4 alkyl, and aminotriaryl methane leuco dyes with any of the preceding named structures that are further substituted with one or more alkyl groups on the aryl rings wherein the latter alkyl groups are independently selected from C1-C3 alkyl. Other leuco dyes can also be used in connection with the present invention and are known to those skilled in the art. A more detailed discussion of some of these types of leuco dyes may be found in U.S. Pat. Nos. 3,658,543 and 6,251,571, each of which are hereby incorporated by reference in their entireties. Additional examples and methods of forming such compounds can be found in Chemistry and Applications of Leuco Dyes, Muthyala, Ramaiha, ed., Plenum Press, New York, London, ISBN: 0-306-45459-9, which is hereby incorporated by reference.

The color former can be about 3 wt % to 35 wt % of the imaging layer, about 10 wt % to 30 wt % of the imaging layer, and about 10 wt % to 20 wt % of the imaging layer.

As used herein, the term "activator" is a substance that reacts with a color former and causes the color former to alter its chemical structure and change or acquire color. The activator can include a compound that has an acid such as, but not limited to, a Lewis acid that has a functionality such as a complexed transition metal, metal salt, phenolic compound, and combinations thereof, and can be reactive with leuco dyes with or without introduction of energy in the form of light and/or heat. In particular, the activators may include, but is not limited to, proton donors and acidic phenolic compounds (e.g., benzyl hydroxybenzoate, bisphenol-A and bisphenol-S) as well as derivatives thereof (e.g., D8™ (4-hydroxyphenyl-4'-isopropoxyphenyl sulfone), TG-SA™ (bis(4-hydroxy-3-allylphenyl)sulfone), polyphenols, and sulfonylurea and derivatives thereof such as Pergafast™-201 made by "Ciba".

The activator is from about 2 wt % to 50 wt % of the imaging layer and, preferably, from about 5 wt % to 35 wt % of the imaging layer.

The crosslinking agent can include, but is not limited to, aldehyde compounds (e.g., formaldehyde, glyoxal and glutaraldehyde); ketone compounds (e.g., diacetyl and cyclopentanedione); active halogen compounds (e.g., bis(2-chloroethylurea)-2-hydroxy-4,6-dichloro-1,3,5-triazine and 2,4-dichloro-6-s-triazine sodium salt); active vinyl compounds (e.g., divinyl sulfonic acid, 1,3-vinylsulfonyl-2-propanol, N,N'-ethylene-bis(vinylsulfonylacetamide), and 1,3,5-triacryloyl-hexahydr-o-s-triazine); N-methylol compounds (e.g., dimethylolurea and methyloldimethylhydantoin); melamine resins (e.g., methylolmelamine and alkylated methylolmelamine); epoxy resins; isocyanate compounds (e.g., 1,6-hexamethylenediisocyanate); aziridine compounds disclosed in U.S. Pat. Nos. 3,017,280 and 2,983,611; carboxyimide compounds disclosed in U.S. Pat. No. 3,100,704 which are incorporated herein by reference; epoxy compounds (e.g., glycerol triglycidyl ether); ethyleneimino compounds (e.g., 1,6-hexamethylene-N,N'-bis-ethyleneurea); halogenated carboxyaldehyde compounds (e.g., mucochloric acid and mucophenoxychloric acid); dioxane compounds (e.g., 2,3-dihydroxydioxane); metal-containing compounds (e.g., titanium lactate, aluminum sulfate, chromium alum, potassium alum, zirconyl acetate and chromiumacetate); polyamine compounds (e.g., tetraethylenepentamine); hydrazide compounds (e.g., adipic dihydrazide); and low molecular weight compounds and polymers having 2 or more oxazoline groups.

The crosslinking agent can be about 0.5 wt % to 2 wt % of the imaging layer, about 0.2 wt % to 1 wt % of the imaging layer, and about 0.2 wt % to 0.75 wt % of the imaging layer.

Surfactants can also be present, such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, such surfactants can be about 0.5 wt % to 5 wt % of the imaging layer, about 0.5 wt % to 2.5 wt % of the imaging layer, and about 0.5 wt % to 1 wt % of the imaging layer.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE 1

In this example a coating was prepared that contained a UV curable lacquer, a luecodye, developers, photoinitiators, and Dye LS231 from Sanyo Color Works, LTD. The broad absorption band of the Dye LS231 allows for the coating to absorb radiation from the 780 nm or 650 nm lasers in optical disc drives. Thus either 650 nm or 780 nm light can be used to image the coating.

The formulation of the coating is described in Table 1

TABLE 1

|  | wt. % |
|---|---|
| Lacquer | 51.47 |
| Pergafast-201 | 4.16 |
| LS231 (650/780 nm absorber) | 1.80 |
| D8 | 3.99 |
| Yoshinox-SR | 2.40 |
| Bisphenol-S | 3.24 |
| Irgacure-1300 | 6.43 |
| Foamblast-20F | 1.50 |
| BK400 (milled - 0.3 um) | 25.00 |
| Total | 100.00 |

EXAMPLE 2

In this example a coating was prepared that contained a UV curable lacquer, a luecodye, developers, photoinitiators, Dye 783 (by Organica, 1,1'-Dibutyl-3,3,3',3'-tetramethylindadicarbocyanine hexafluorophosphate) and IR780 (CAS 207399-07-3). Dye 783 has an absorption maximum at 650 nm. Dye IR780 has an absorption maximum at 780 nm. Thus, either 650 nm or 780 nm light can be used to image the coating.

The formulation of the coating is described in Table 2.

TABLE 2

|  | wt. % |
|---|---|
| Lacquer | 51.47 |
| Pergafast-201 | 4.16 |
| Organica Dye 783 (650 nm absorber) | 1.00 |
| IR780 (780 nm absorber) | 0.80 |
| D8 | 3.99 |
| Yoshinox-SR | 2.40 |
| Bisphenol-S | 3.24 |
| Irgacure-1300 | 6.43 |
| Foamblast-20F | 1.50 |
| BK400 (milled - 0.3 um) | 25.00 |
| Total | 100.00 |

Activators (D8, Bisphenol-S and Pergafast-201), radiation absorbers (IR780 and Dye 783) and UV-initiator (Irgacure-1300) are dissolved in UV-curable lacquer. After the dissolution color-former (BK400 milled down to particle size ~0.3 um) and anti-foam (Lubrisol Foamblast 20F) are dispersed in the resulting lacquer solution.

The formulation of UV-curable lacquer is made by mixing UV-curable monomers and oligomers listed below.

|              | wt. %  |
|--------------|--------|
| SR238        | 32.00  |
| SR506        | 32.00  |
| Ebecryl-605  | 27.00  |
| SR306HP      | 9.00   |
| Total        | 100.00 |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'". The term "consisting essentially of" is defined to include an imaging layer that includes the near-infrared radiation-absorbing compound specifically mentioned as well as other components (e.g., matrix, color former, activator, and the like), while not including other radiation-absorbing compounds not specifically mentioned in the formulation.

Many variations and modifications may be made to the above-described embodiments. All such modifications and variations are intended to be included herein within the scope of this disclosure and protected by the following claims.

The invention claimed is:

1. An optical disk comprising:
   imaging layer that includes:
   a matrix;
   a radiation-absorbing compound having at least two energy absorption peaks corresponding to about 780 nm and about 650 nm, respectively;
   an activator; and
   a color former,
   wherein the layer includes: the matrix in an amount of about 2 to 98 weight percent of the layer, the radiation-absorbing compound in an amount of about 0.05 to 5 weight percent of the layer, the activator in an amount of about 2 to 50 weight percent of the layer, and the color former in an amount of about 3 to 35 weight percent of the layer.

2. The optical disk of claim 1, wherein the optical disk is selected from a compact disk (CD) and a digital video disk (DVD), HD DVD, or Blu-ray.

3. The optical disk of claim 1, wherein the optical disk is selected from one the following: HD DVD, Blu-ray, DVD, DVD-R, DVD-RW, DVD+R, DVD+RW, DVD-RAM, DVD-ROM, DVD-DL, DVD+DL, CD, CD-ROM, CD-R, or CD-RW.

4. The optical disk of claim 1, wherein the optical disk stores digital data.

5. The optical disk of claim 1, wherein the radiation-absorbing compound is selected as Dye LS231.

6. A material comprising:
   a matrix;
   a radiation-absorbing compound having at least two energy absorption peaks corresponding to about 780 nm and about 650 nm, respectively;
   an activator; and
   a color former, wherein the matrix is about 2 to 98 weight percent of the material, the radiation-absorbing compound is about 0.05 to 5 weight percent of the material, the activator is about 2 to 50 weight percent of the material, and the color former is about 3 to 35 weight percent of the material.

7. The material of claim 6, wherein the radiation-absorbing compound is selected as Dye LS231.

8. An optical disk comprising:
   imaging layer that includes:
   a matrix;
   a first radiation-absorbing compound that absorbs light energy at about 780 nm and a second radiation-absorbing compound that absorbs light energy at about 650 nm;
   an activator; and
   a color former,
   wherein the layer includes: the matrix in an amount of about 2 to 98 weight percent of the layer, the first radiation-absorbing compound in an amount of about 0.05 to 5 weight percent of the layer, the second radiation-absorbing compound in an amount of about 0.05 to 5 weight percent of the layer, the activator in an amount of about 2 to 50 weight percent of the layer, and the color former in an amount of about 3 to 35 weight percent of the layer.

9. The optical disk of claim 8, wherein the optical disk is selected from a compact disk (CD), a digital video disk (DVD), HD DVD, or Blu-ray.

10. The optical disk of claim 8, wherein the optical disk is selected from one the following: HD DVD, Blu-ray, DVD, DVD-R, DVD-RW, DVD+R, DVD+RW, DVD-RAM, DVD-ROM, DVD-DL, DVD+DL, CD, CD-ROM, CD-R, or CD-RW.

11. The optical disk of claim 8, wherein the optical disk stores digital data.

12. The optical disk of claim 8, wherein first radiation-absorbing compound is selected from (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9CI)), (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt), and combinations thereof, and the second radiation-absorbing compound is selected from: 3-Ethyl-2-[5-(3-ethyl-2-benzothiazolinylidene)-1,3-pentadienyl]benzothiazolium iodide, 1,1'-Dibutyl-3,3,3',3'-tetramethylindodicarbocyanine perchlorate, 1,1'-Dibutyl-3,3,3',3'-tetramethylindadicarbocyanine hexafluorophosphate, and combinations thereof.

13. A material comprising:
   a matrix;
   a first radiation-absorbing compound that absorbs light energy at about 780 nm and a second radiation-absorbing compound that absorbs light energy at about 650 nm;
   an activator; and
   a color former, wherein the matrix is about 2 to 98 weight percent of the material, the first radiation-absorbing compound is about 0.05 to 5 weight percent of the material, the second radiation-absorbing compound is about 0.05 to 5 weight percent of the material, the activator is about 2 to 50 weight percent of the material, and the color former is about 3 to 35 weight percent of the material.

14. The material of claim 13, wherein first radiation-absorbing compound is selected from (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9Cl)), (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt), and combinations thereof, and the second radiation-absorbing compound is selected from: 3-Ethyl-2-[5-(3-ethyl-2-benzothiazolinylidene)-1,3-pentadienyl]benzothiazolium iodide, 1,1'-Dibutyl-3,3,3',3'-tetramethylindodicarbocyanine perchlorate, 1,1'-Dibutyl-3,3,3',3'-tetramethylindadicarbocyanine hexafluorophosphate, and combinations thereof.

15. An optical disk comprising:
  imaging layer that includes:
    a matrix;
    a first radiation-absorbing compound that absorbs light energy at about 780 nm and a third radiation-absorbing compound that bleaches upon exposure to a wavelength of about 280 to 480 nm;
    an activator; and
    a color former.

16. The optical disk of claim 15, wherein the optical disk is selected from a compact disk (CD), a digital video disk (DVD), HD DVD, or Blu-ray.

17. The optical disk of claim 15, wherein the optical disk is selected from one the following: HD DVD, Blu-ray, DVD, DVD-R, DVD-RW, DVD+R, DVD+RW, DVD-RAM, DVD-ROM, DVD-DL, DVD+DL, CD, CD-ROM, CD-R, or CD-RW.

18. The optical disk of claim 15, wherein the optical disk stores digital data.

19. The optical disk of claim 15, wherein first radiation-absorbing compound is selected from (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9Cl)), (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt), and combinations thereof, and the third radiation-absorbing compound is selected from: 3-Ethyl-2-[5-(3-ethyl-2-benzothiazolinylidene)-1,3-pentadienyl]benzothiazolium iodide, 1,1'-Dibutyl-3,3,3',3'-tetramethylindodicarbocyanine perchlorate, 1,1'-Dibutyl-3,3,3',3'-tetramethylindadicarbocyanine hexafluorophosphate, and combinations thereof.

20. The optical disk of claim 15, wherein the layer includes: the matrix in an amount of about 2 to 98 weight percent of the layer, the first radiation-absorbing compound in an amount of about 0.05 to 5 weight percent of the layer, the third radiation-absorbing compound in an amount of about 0.05 to 5 weight percent of the layer, the activator in an amount of about 2 to 50 weight percent of the layer, and the color former in an amount of about 3 to 35 weight percent of the layer.

21. A material comprising:
  a matrix;
  a first radiation-absorbing compound that absorbs light energy at about 780 nm and a third radiation-absorbing compound that bleaches upon exposure to a wavelength of about 280 to 480 nm;
  an activator; and
  a color former.

22. The material of claim 21, wherein first radiation-absorbing compound is selected from (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide (9Cl)), (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indolium hydroxide, inner salt sodium salt), and combinations thereof, and the third radiation-absorbing compound is selected from: 3-Ethyl-2-[5-(3-ethyl-2-benzothiazolinylidene)-1,3-pentadienyl]benzothiazolium iodide, 1,1'-Dibutyl-3,3,3',3'-tetramethylindodicarbocyanine perchlorate, 1,1'-Dibutyl-3,3,3',3'-tetramethylindadicarbocyanine hexafluorophosphate, and combinations thereof.

23. The material of claim 21, wherein the matrix is about 2 to 98 weight percent of the material, the first radiation-absorbing compound is about 0.05 to 5 weight percent of the material, the third radiation-absorbing compound is about 0.05 to 5 weight percent of the material, the activator is about 2 to 50 weight percent of the material, and the color former is about 3 to 35 weight percent of the material.

* * * * *